United States Patent Office 3,644,281
Patented Feb. 22, 1972

3,644,281
STABLE ORGANIC COMPOSITIONS CONTAINING A PHENOLIC ANTIOXIDANT
Bernard R. Meltsner, Royal Oak, Mich., assignor to Ethyl Corporation, New York, N.Y.
No Drawing. Original application July 9, 1965, Ser. No. 470,890, now Patent No. 3,579,561, dated May 18, 1971. Divided and this application Jan. 22, 1970, Ser. No. 5,099
Int. Cl. C08c 27/66; C08d 11/04; C08f 45/58
U.S. Cl. 260—45.85
11 Claims

ABSTRACT OF THE DISCLOSURE

Hydroxybenzylphenyl carbonates and carboxylates are useful as stabilizers for organic material. They may be used alone or in combination with a dihydrocarbylthiodialkanoate.

---

This application is a division of application Ser. No. 470,890, filed July 9, 1965 now U.S. Pat. 3,579,561.

This invention relates to new compounds useful for the stabilization if organic material. In particular, this invention relates to novel phenolic carboxylic acid esters and carbonates that impart exceptional stability to plastics when used alone and in combination with organic sulfur compounds.

It is a common practice to include an antioxidant in plastic formulations to protect them from oxidative degradation during processing and during subsequent use periods. Some alkylated phenols are frequently used for this purpose. Although some alkylated phenols provide excellent antioxidant protection for plastics, they often break down when exposed to elevated temperatures, usually encountered during processing of the plastic. The resultant loss of antioxidant protection rapidly leads to color formation and polymer degradation. Therefore, a need exists for a stabilizing composition that will provide antioxidant protection for plastics and which is not destroyed by the high temperatures encounterede during processing.

It is an object of this invention to provide novel antioxidants and highly stable organic compositions. A further object is to provide improved plastics that are resistant to thermal and oxidative degradation. A particular object is to provide a high molecular weight polyolefin of enhanced stability.

These and other objects are accomplished by providing antioxidants having the formula:

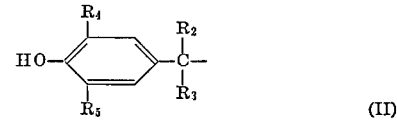

wherein $n$ is 1 or 2, $R_1$ is selected from the group consisting of alkyl radicals having 1–12 carbon atoms, aralkyl radicals having 7–12 carbon atoms, and aryl radicals having 6–12 carbon atoms, $R_2$ and $R_3$ are selected from the group consisting of hydrogen and lower alkyl radicals having 1–6 carbon atoms; $R_4$ is a hydrocarbon radical containing 1–18 carbon atoms such as an alkyl radical containing 1–18 carbon atoms or an aralkyl radical containing 8–18 carbon atoms; $R_5$ is an alpha-branched hydrocarbon radical containing 3–18 carbon atoms; $R_6$ is selected from the group consisting of hydrogen, alkyl radicals having 1–12 carbon atoms, aryl radicals having 6–12 carbon atoms and aralkyl radicals having 7–12 carbon atoms; and $R_7$ is selected from the group consisting of alkyl radicals having 1–12 carbon atoms, aralkyl radicals containing 7–18 carbon atoms and radicals having the formula:

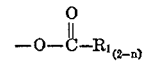

wherein $R_2$, $R_3$, $R_4$ and $R_5$ are the same as above.

In Formula I, $R_6$ and $R_7$ are bonded to positions ortho or para to the position bearing the

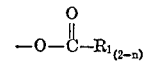

substitution. Thus, $R_6$ may be ortho and $R_7$ para, $R_7$ may be ortho and $R_6$ para, or $R_6$ and $R_7$ may both be in the ortho position. This ortho-para type substitution is shown in the formulae used herein by substituting the positions meta to the position bearing the $$-O-\overset{O}{\underset{\|}{C}}-R_{1_{(2-n)}}$$

substitution with hydrogen atoms, thus leaving only ortho and para positions to accept the three remaining radicals. Some examples of these compounds are:

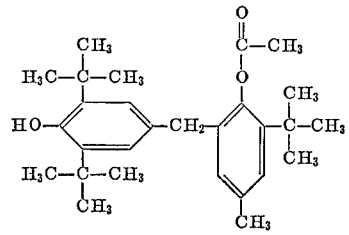

2-tert-butyl-4-methyl-6-(3,5-di-tert-butyl-4-hydroxybenzyl)phenyl acetate

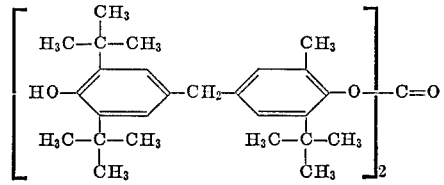

bis[2-tert-butyl-6-methyl-4-(3,5-di-tert-butyl-4-hydroxybenzyl)phenyl]carbonate

Other examples include:
2-methyl-4-isooctyl-6-(3-methyl-5-tert-butyl-4-hydroxy-α-methylbenzyl)phenyl valerate
2-tert-butyl-4-methyl-6-(3,5-diisopropyl-4-hydroxybenzyl)phenyl benzoate
2-tert-butyl-4-(α-methylbenzyl)-6-(α-methyl-3,5-di-tert-butyl-4-hydroxybenzyl)phenyl valerate
2,6-di-tert-butyl-4-(3,5-di-tert-butyl-4-hydroxybenzyl)phenyl propionate
bis[2,6-diisopropyl-4-(3,5-diisopropyl-4-hydroxybenzyl)phenyl]carbonate
bis[2-methyl-4-[3,5-di(α-methylbenzyl)-4-hydroxybenzyl]-6-(α-methylbenzyl)phenyl]carbonate
2-methyl-4-tert-butyl-6-(3,5-di-tert-butyl-4-hydroxybenzyl)phenyl-4-tert-butyl-benzoate.
2-isooctyl-4-methyl-6-(3-methyl-5-tert-butyl-4-hydroxy-α-methylbenzyl)phenyl-n-butyrate
2,4-di-dodecyl-6-(3,5-di-sec-octadecyl-4-hydroxybenzyl)phenyl laurate In a preferred embodiment, $R_7$ in Formula I is a radical having Formula II, and the other radical designations are the same as previously set forth. These compounds are illustrated by the following formula:

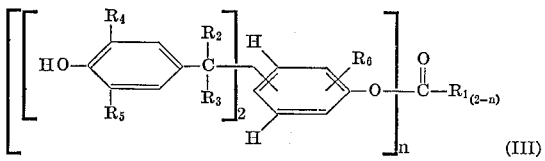

(III)

wherein $n$ is an integer from 1–2, and $R_1$, $R_2$, $R_3$, $R_4$, $R_5$ and $R_6$ are the same as previously designated. Some examples of these compounds include:

2-tert-butyl-4,6-bis(3,5-di-tert-butyl-4-hydroxybenzyl) phenyl acetate
4-tert-butyl-2,6-bis(3,5-diisopropyl-4-hydroxybenzyl) phenyl propionate
2-methyl-4,6-bis(3-methyl-5-tert-octyl-4-hydroxybenzyl) phenyl benzoate
2-(α-methylbenzyl)-4,6-bis(3-methyl-5-tert-octadecyl-4-hydroxybenzyl)phenyl acetate
4-methyl-2,6-bis(3-ethyl-5-isopropyl-4-hydroxybenzyl) phenyl laurate
bis[2-methyl-4,6-bis(3,5-di-tert-butyl-4-hydroxybenzyl) phenyl]carbonate
bis[2-ethyl-4,6-bis(3-methyl-5-octadecyl-4-hydroxybenzyl)phenyl]carbonate
bis[2-tert-butyl-4,6-bis(3,5-di-tert-butyl-4-hydroxybenzyl)phenyl]carbonate
bis[4-tert-butyl-2,6-bis(3,5-di-tert-butyl-4-hydroxybenzyl)phenyl]carbonate
bis[4-(α,α-dimethylbenzyl)-2,6-bis(3-methyl-5-tert-octyl-4-hydroxybenzyl)phenyl]carbonate
bis[4-dodecyl-2,6-bis(3,5-diisopropyl-4-hydroxybenzyl) phenyl]carbonate In an especially preferred embodiment, $R_7$ has Formula II and $R_4$ and $R_5$ are both alpha-branched hydrocarbyl radicals selected from the group consisting of secondary and tertiary alkyl radicals containing 3–18 carbon atoms or aralkyl radicals containing 8–18 carbon atoms. Some examples of these especially preferred antioxidant compounds include:

2-tert-amyl-4,6-bis(3,5-di-tert-amyl-4-hydroxybenzyl) phenyl valerate
4-methyl-2,6-bis(3,5-diisopropyl-4-hydroxybenzyl)phenyl benzoate
bis[2-methyl-4,6-bis(3,5-di-tert-decyl-4-hydroxybenzyl) phenyl]carbonate
bis[4-ethyl-2,6-bis(3-tert-butyl-5-tert-decyl-4-hydroxybenzyl)phenyl]carbonate In a highly preferred embodiment of this invention, $R_7$ in Formula I is a radical of Formula II and is located on the benzene ring in a position ortho to the position bearing the

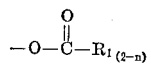

substitution, and $R_6$ is located in the position para to the position bearing the

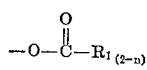

substitution. Some examples of these compounds are:

4-ethyl-2,6(3-methyl-5-tert-butyl-4-hydroxybenzyl) phenyl acetate
4-(α-methylbenzyl)-2,6-bis[3-methyl-5-(α-methylbenzyl)-4-hydroxybenzyl]phenyl benzoate
4-tert-amyl-2,6-bis(3-ethyl-5-tert-octyl-4-hydroxybenzyl) phenyl acetate
bis[4-(α-methylbenzyl)-2,6-bis(3,5-di-tert-butyl-4-hydroxybenzyl)phenyl]carbonate
bis[4-methyl-2,6-bis(3-methyl-5-tert-butyl-4-hydroxybenzyl)phenyl]carbonate In a most highly preferred embodiment of this invention $R_7$ in Formula I is a radical having Formula II and is located on the benzene ring in the position ortho to the position bearing the

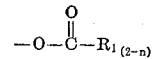

substitution, and $R_6$ is located in the position para to the position bearing the

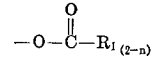

substitution, and $R_4$ and $R_5$ are alpha-branched hydrocarbon radicals containing 3–18 carbon atoms.

A most preferred antioxidant compound of this invention is 4-tert-butyl-2,6-bis(3,5-di-tert-butyl-4-hydroxybenzyl)phenyl acetate.

Another embodiment of this invention is a stabilizing composition comprising about 10–90 weight percent of a compound previously described by Formula I and about 10–90 weight percent of a sulfur compound having the formula:

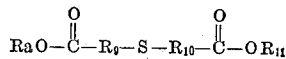

V wherein $R_9$ and $R_{10}$ are divalent hydrocarbon radicals selected from the group consisting of alkylene radicals containing about 1–6 carbon atoms and arylene radicals containing about 6–12 carbon atoms, and $R_8$ and $R_{11}$ are alkyl radicals containing about 6–20 carbon atoms.

Some examples of the compounds defined by Formula IV include: dihexylthiodiacetate, diheptylthiodivalerate, di-n-octylthiodibutyrate, di-2-octylthiodicaproate, didodecylthiodiacetate, diundecylthiobutyrate, diheptadecylthiodivalerate, dioctadecylthiodipropionate, dinonadecylthiodibutyrate, dieicosylthiodipropionate, 4,4'-thiobis(laurylbenzoate) and 4,4'-thiobis(hexylbenzoate).

Preferred embodiments of the stabilizing compositions of this invention contain, as a phenolic constituent, about 10–90 weight percent of the preferred stabilizing compounds heretofore set forth and about 10–90 weight percent of the sulfur compound defined by Formula IV.

A preferred class of sulfur compounds are those having Formula IV wherein $R_8$ and $R_{11}$ are alkyl radicals having about 10–16 carbon atoms and $R_9$ and $R_{10}$ are divalent alkylene radicals containing about 1–3 carbon atoms. Examples of these sulfur compounds include didecylthiodiacetate, dicetylthiodipropionate and dilaurylthiodibutyrate. A most preferred sulfur compound in the stabilizing compositions of this invention is dilaurylthiodipropionate. Thus, highly preferred classes of stabilizing compositions are represented by compositions containing about 10–90 weight percent of the previous preferred classes of phenolic compounds and about 10–90 weight percent of dilaurylthiodipropionate.

A most preferred stabilizing composition of this invention comprises about 10–90 weight percent of 4-tert-butyl-4-hydroxybenzylphenyl carbonate and about 10–90 weight percent of dilaurylthiodipropionate.

The phenolic compounds of this invention may be prepared by first alkylating a phenol in its ortho position. This is accomplished by reacting a phenol having a hydrogen atom on a carbon atom ortho to the hydroxyl group with an olefinic compound in the presence of an aluminum phenoxide catalyst. For example, 2,6-di-tert-butylphenol is conveniently prepared by reacting phenol with isobutylene in the presence of a small amount of aluminum phenoxide.

The temperatures employed in this reaction vary from about 50° C. to about 200° C., and reaction times of from about one-half hour to 10 or more hours are profitably employed to give a good yield of the product. The aluminum phenoxide catalyst may be prepared from the phenol employed in the reaction or from some other phenol. Thus, when phenol itself is a reactant in the process a small amount of aluminum phenoxide may be employed as the catalyst. This catalyst is prepared by merely heating the phenol with the desired amount of aluminum until a reaction takes place between the aluminum and phenol, forming aluminum phenoxide. To obtain the elevated temperatures sometimes necessary in the catalyst preparation and in the subsequent alkylation, pressure may be resorted to, although a pressure reaction is usually not necessary when alkylating phenol with a high molecular weight olefin such as styrene or α-methylstyrene. The preparation of the ortho-alkylated phenol starting materials is more fully described in U.S. Pat. 3,075,832.

In the next step, the ortho substituted phenols are converted to 3,5-disubstituted-4-hydroxybenzyl chloride derivatives by reacting the ortho-substituted phenol with a carbonyl compound such as formaldehyde and with hydrogen chloride.

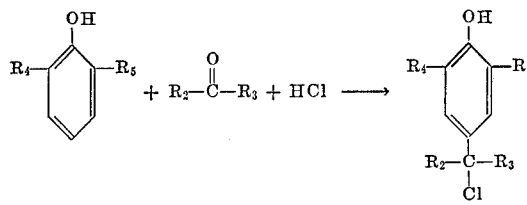

This process is more fully described in co-pending application Ser. No. 53,363, filed Sept. 1, 1960, now U.S. 3,257,321.

In one preparative method the 3,5-dialkyl-4-hydroxybenzyl chloride prepared above is reacted with the desired phenyl carboxylate (a carboxylate is a carboxylic acid ester) or bisphenyl carbonate in the presence of a suitable Friedel-Craft type catalyst. This method is illustrated by the following equation:

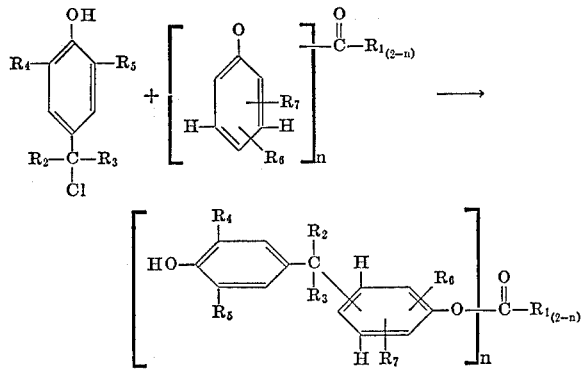

In another preparative method the 3,5-dialkyl-4-hydroxybenzyl chloride is first reacted with the appropriate phenol, following which the phenol is reacted with an acid anhydride, acid halide or phosgene. This method is especially useful when the alkyl groups on the 3,5-dialkyl-4-hydroxybenzyl halide are tertiary groups, thus hindering the 4-hydroxy radical and preventing the acid anhydride, acid halide or phosgene from reacting with it. This sequence of reaction is illustrated by the following equations.

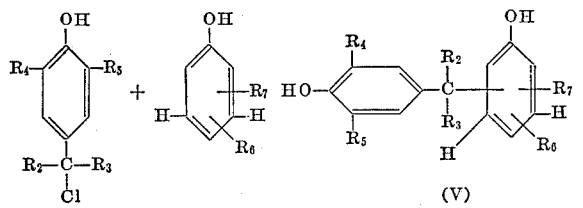

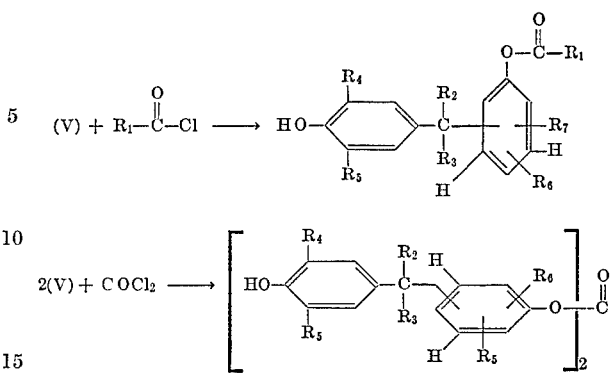

The following examples serve to illustrate some methods of preparing the additive compounds of this invention. All parts are parts by weight and where mole quantities are indicated it is understood that these are mole parts.

EXAMPLE 1

In a reaction vessel equipped with stirrer, reflux condenser, thermometer and heating means was placed 13 parts of 3,5-dit-tert-butyl-4-hydroxybenzyl chloride, 20 parts hexane, 3.7 parts p-tert-butylphenol and one part anhydrous stannic chloride. The reaction vessel was then flushed with nitrogen and a nitrogen atmosphere retained over the reactants during the remainder of the experiment. While stirring, the reaction mixture was heated to 65–70° C. and maintained at this temperature for 1.5 hours. The reaction mixture was then cooled to room temperature, during which period white crystals began to form. About 50 parts of diethyl ether were added, causing the crystals to go back into solution. Following this, the reaction solution was washed with water and then dried over anhydrous sodium sulfate. Following this, the reaction solution was evaporated to dryness, leaving 13 parts of a solid product identified as 4-tert-butyl-2,6-bis(3,5-di-tert-butylbenzyl) phenol by its infrared spectra and carbon-hydrogen analysis.

In a second reaction vessel was placed 1.0 part of the derivative prepared above together with 5 parts of acetic anhydride. This reaction vessel was equipped the same as above. This reaction mixture was refluxed for 3 hours, during which period the solids slowly went into solution. After this period, the reaction mixture was cooled to room temperature and all volatile material removed by evaporation at reduced pressure over a 60–70° hot water bath. The product remaining was identified by its infrared spectra to be 4-tert-butyl-2,6-bis(3,5-di-tert-butyl-4-hydroxybenzyl)phenyl acetate.

In the above example, other 3,5-dialkyl-4-hydroxybenzyl halides can be employed, yielding correspondingly different derivatives. For example, if 3,5-di(α-methylbenzyl)-4-hydroxybenzyl chloride is used, 4-tert-butyl-2,6-bis-[3,5 - bis(α - methylbenzyl)-4-hydroxybenzyl)phenyl]acetate will be obtained. If 3,5-di-tert-octyl-4-hydroxybenzyl chloride is employed, 4-tert-butyl-2,6-bis(3,5-di-tert-octyl-4-hydroxybenzyl)phenyl acetate is produced.

Likewise, the 3,5-dialkyl-4-hydroxybenzyl chloride employed can be condensed with different phenolic derivatives. For instance, if o-cresol is used in the above example, 2-methyl-4,6-bis(3,5-di-tert-butyl - 4 - hydroxybenzyl) phenyl acetate is obtained. In like manner, if o-tert-butylphenol is used, 2-tert-butyl-4,6-bis(3,5-di-tert-butyl-4-hydroxybenzyl)phenyl acetate will be obtained.

Furthermore, other acid anhydrides may be used, leading to correspondingly different carboxylate derivatives. For example, the use of propionic anhydride will yield the corresponding propionate. Butyric anhydride will result in the formation of the butyrate. The use of benzoic anhydride or benzoyl chloride will yield the corresponding benzoate.

EXAMPLE 2

To a reaction vessel equipped as in Example 1 is added one mole of 3,5-di-tert-butyl-4-hydroxybenzyl chloride and 1,000 parts of hexane. To this is added 0.5 mole of o-tert-butylphenol and 5.0 parts of anhydrous stannic chloride, following which the reaction is refluxed for 4 hours. This results in the formation of 2-tert-butyl-4,6-bis-(3,5-di-tert-butyl-4-hydroxybenzyl)phenol. Following this, phosgene is passed into the liquid phase of the mixture until a pressure of about 5 p.s.i.g. of phosgene builds up. Stirring is continued for an additional 8 hours, while maintaining the reaction temperature at 30–40° C. and the phosgene pressure at about 5 p.s.i.g. A small amount of the gas phase is continually withdrawn and replaced with additional phosgene in order to provide a means of removing by-product HCl. Following this, the reaction is washed with water and dried over anhydrous sodium sulfate. Then the solvent is removed by evaporation at reduced pressure, yielding bis[2-tert-butyl-4,6(3,5-di-tert-butyl-4-hydroxybenzyl)phenyl]carbonate.

Other 3,5-dialkyl-4-hydroxybenzyl halides can be employed in the above method to yield other derivatives according to the forementioned reactions. For example, 3,5-di(α - methylbenzyl)-4-hydroxybenzyl chloride may be used, yielding bis[2-tert-butyl - 4,6 - bis(3,5-di(α-methylbenzyl)-4-hydroxybenzyl)phenyl]carbonate. The use of 3,5-diisopropyl-4-hydroxybenzyl chloride will result in bis [2-tert-butyl-4,6-bis(3,5-diisopropyl - 4 - hydroxybenzyl) phenyl]carbonate. Likewise, 3,5 - di-sec-butyl-hydroxybenzyl chloride leads to bis[2-tert-butyl-4,6-bis(3,5-di-sec-butyl-4-hydroxybenzyl)phenyl]carbonate.

Likewise, other phenols can be condensed with the 3,5-dialkyl-4-hydroxybenzyl chlorides. In the above example, for instance, o-cresol can be used, yielding bis[2-methyl-4,6 - bis(3,5-di-tert-butyl - 4 - hydroxybenzyl]carbonate. The use of p-cresols leads to bis[4-methyl-2,6-bis(3,5-di-tert-butyl - 4 - hydroxybenzyl)phenyl]carbonate. In like manner, p-tert-butylphenol will form bis[4-tert-butyl-2,6-bis(3,5 - di-tert-butyl-4-hydroxybenzyl)phenyl]carbonate. Furthermore, p-(α-methylbenzyl)phenol can be employed, yielding bis[4-(α-methylbenzyl)-2,6-bis(3,5-di-tert-butyl-4-hydroxybenzyl)phenyl]carbonate.

EXAMPLE 3

In a reaction vessel equipped as in Example 1 is placed 2 moles of p-tert-amylphenol and 500 parts of hexane. Phosgene is passed into the solution while stirring and maintaining the temperature at about 40° C. This is continued for 4 hours, following which nitrogen is bubbled through the solution to drive off unreacted phosgene and HCl by-product. Following this, 50 parts of anhydrous stannic chloride is added and then 4.0 moles of 3-methyl-5-tert-butyl-4-hydroxybenzyl chloride. The mixture is refluxed for 8 hours, following which it is cooled to room temperature, water washed and dried over anhydrous sodium sulfate. After filtering to remove the sodium sulfate, the hexane is evaporated, leaving bis[4-amyl-2,6-bis(3-methyl-5-tert-butyl-4-hydroxybenzyl)phenyl]carbonate.

EXAMPLE 4

In a reaction vessel as used in Example 1 is placed one mole of o-ethylphenol and 500 parts of hexane. To this is added 1.0 mole of benzoyl chloride and the reaction mixture refluxed for 6 hours, during which period about one mole of HCl is evolved. Following this, 25 parts of anhydrous aluminum chloride is added to the mixture, followed by 2 moles of 3,5-diisopropyl-4-hydroxybenzyl chloride. The mixture is refluxed for 2 hours and then washed with dilute aqueous HCl to remove the aluminum chloride catalyst. Following this, it is water washed and then dried over anhydrous sodium sulfate. After filtration to remove the sodium sulfate, the hexane solvent is evaporated over a steam bath, leaving 2-ethyl-4,6-bis (3,5-diisopropyl-4-hydroxybenzyl)phenyl benzoate.

The sulfur compounds used in the stabilizing compositions of this invention are readily available or can be made using standard synthetic procedures. For example, dialkylthiodipropionate can be made from the reaction of hydrogen sulfide with alkyl acrylates. Another method of preparing the thiobis compounds is from the reaction of halogenated acid esters, such as γ-chlorostearylpropionate, with sodium sulfide. Thiobis aromatic esters can be prepared from the reaction of benzoate esters or derivatives thereof with sulfur dichloride in the presence of a Lewis acid catalyst such as aluminum chloride. The following examples will illustrate some of these preparative methods. All parts are parts by weight unless otherwise indicated.

EXAMPLE 5

In a pressure vessel fitted with an agitator, means for delivering hydrogen sulfide and heating and cooling means is placed 592 parts of hexadecylacrylate and 1,000 parts of hexane. The vessel is sealed and, while stirring, hydrogen sulfide is passed into the vessel until 200 p.s.i.g. is attained. The temperature is then slowly raised to 100° C. and stirring continued for 4 hours. Following this, the vessel contents are cooled and the residual pressure vented. The contents are discharged into a second vessel and water washed. The organic layer is separated and the hexane evaporated therefrom, leaving dicetylthiodipropionate.

EXAMPLE 6

In a reaction vessel equipped as in Example 1 is placed 609 parts of lauryl-δ-chlorovalerate and 1,000 parts of dioxane. Eighty parts of sodium sulfide are added and, while stirring, the reaction mass is heated to reflux. Reflux is continued for 4 hours, following which the vessel contents are discharged into 1,000 parts of water, whereupon dilaurylthiodivalerate precipitates.

EXAMPLE 7

In a reaction vessel equipped with a stirrer, thermometer, reflux condenser and addition funnel is placed 750 parts of octadecyl carboxylate, 100 parts of aluminum chloride and 1,000 parts of hexane. One hundred and five parts of sulfur dichloride are placed in the addition funnel. The reaction vessel contents are heated to 50° C. while stirring, and, while maintained at this temperature, the sulfur dichloride is slowly added over a period of one hour. Following this, the reaction temperature is increased to reflux, and reflux is continued for 4 more hours. Following this, the vessel contents are cooled and water washed. The hexane is then evaporated from the organic layer, leaving 3,3'-thiobis octadecyl carboxylate.

The compounds and stabilizing compositions of this invention find important utility as antioxidants in a wide variety of oxygen sensitive materials. Thus, liquid hydrocarbon fuels such as gasoline, kerosene and fuel oil are found to possess greatly increased storage stability by the use of an antioxidant of this invention. Likewise, liquid hydrocarbon fuels such as gasoline which contain organometallic additives such as tetraethyllead, as well as other organometallic compounds which are used as fuel additives, attain appreciably increased oxidative stability by the practice of this invention. In addition, lubricating oils and functional fluids, both those derived from naturally occurring hydrocarbons and those synthetically prepared, are greatly enhanced by the practice of this invention. The addition of small quantities of the compounds of this invention to such materials as turbine, hydraulic, transformer and other highly refined industrial oils; waxes; soaps and greases; plastics; organometallic compositions such as tetraethyllead and tetraethyllead antiknock fluids; elastomers, including natural rubber; crankcase lubricating oils; lubricating greases; and the like, greatly increase their resistance to deterioration in the presence of air, oxygen or ozone.

The compounds of this invention are also very effective antioxidants for high molecular weight hydrocarbon polymers, such as polybutadiene, methyl rubber, polybutene rubber, natural rubber, butyl rubber, GR–S rubber, GR–N rubber, piperylene rubber, dimethyl butadiene rubber, ethylene-propylene rubber, ethylene-propylene terpolymer, and the like.

The compounds of this invention are also useful in protecting petroleum wax—paraffin wax and micro-crystalline wax—against oxidative deterioration. The compounds of this invention also find use in the stabilization of edible fats and oils of animal or vegetable origin which tend to become rancid, especially during long periods of storage, because of oxidative deterioration. Typical representatives of these edible fats and oils are linseed oil, cod liver oil, caster oil, soybean oil, rapeseed oil, coconut oil, olive oil, palm oil, corn oil, sesame oil, peanut oil, babassu oil, butter, fat, lard, beef tallow, and the like.

An important embodiment of the present invention is rubber containing, as an antioxidant therefor, a compound having Formula I. The stabilizer is incorporated into the rubber by milling, Banbury mixing, or similar process, or is emulsified and the emulsions added to the rubber latex before coagulation. In the various embodiments of this invention the stabilizer is used in small amounts, generally ranging from about 0.001 to about 5.0 percent.

As used in this description, the term "rubber" is employed in a generic sense to define a high molecular weight plastic material which possesses high extensibility under load coupled with the property of forcibly retracting to approximately its original size and shape after the load is removed. It is preferable that the rubber be a sulfur-vulcanizable rubber, such as India rubber, reclaimed rubber, balata, gutta percha, rubbery conjugated diene polymers and copolymers exemplified by the butadiene-styrene (GR-S) and butadiene-acrylonitrile (GR-N or Paracril) rubbers and the like, although the invention is applicable to the stabilization of any rubbery, high molecular weight organic material which is normally susceptible to deterioration in the presence of oxygen, air or ozone. The nature of these rubbers is well known to those skilled in the art.

Among the definite advantages provided by this invention is that the present rubber compositions possess unusually great resistance against oxidative deterioration. Moreover, these compositions exhibit excellent non-staining and non-discoloration characteristics. Furthermore, the novel stabilizer is relatively inexpensive and easily prepared, and possesses the highly beneficial property of low volatility. As is well known, a highly desirable feature of a rubber antioxidant is that it have a low volatility so that it remains admixed with the rubber during vulcanization and related process steps.

The present invention will be still further apparent from the following specific examples wherein all parts and percentages are by weight.

EXAMPLE 8

To a synthetic rubber master batch comprising 100 parts of SB-R rubber having an average molecular weight of 60,000, 50 parts of mixed zinc propionate-stearate, 50 parts of carbon black, 5 parts of road tar, 2 parts of sulfur and 1.5 parts of mercaptobenzothiazole is incorporated 1.5 parts of 2-methyl-4-tert-butyl-6-(3,5-di-tert-butyl-4-hydroxybenzyl)phenyl acetate. This batch is then cured for 60 minutes at 45 p.s.i. of steam pressure.

EXAMPLE 9

Two parts of 2,4-di-tert-butyl-6-[3,5-di($\alpha$-methylbenzyl)-4-hydroxybenzyl]phenyl propionate is incorporated in 100 parts of raw butyl rubber prepared by the copolymerization of 90 percent of isobutylene and 10 percent of isoprene.

EXAMPLE 10

To 200 parts of raw butyl rubber prepared by copolymerization of 95 percent of isobutylene and 5 percent of butadiene is added 1.5 parts of bis[2-methyl-4-isooctyl-6-(3-methyl-5-tert-butyl-4-hydroxy-$\alpha$-methylbenzyl)phenyl]carbonate and 1.0 part of dilaurylthiodipropionate.

EXAMPLE 11

To a master batch of GR–N synthetic rubber comprising 100 parts of GR–N rubber, 5 parts of zinc stearate, 50 parts of carbon black, 5 parts of road tar, 2 parts of sulfur and 2 parts of mercaptobenzothiazole is added 5 percent based on the weight of the batch of 2,6-bis(3,5-di-sec-octadecyl-4-hydroxybenzyl)-4-dodecyl phenyl laurate.

EXAMPLE 12

To natural rubber (Hevea) is added 0.1 percent of bis [2-methyl-4,6-bis(3,5-diisocyropyl-4-hydroxybenzyl) phenyl]carbonate.

EXAMPLE 13

A butadiene-acrylonitrile copolymer is produced from butadiene-1,3 and 32 percent of acrylonitrile. Two percent (based on the dry weight of the copolymer) of 2-tert-butyl-4-($\alpha$-methylbenzyl)-6-(3,5-di-tert-butyl-4-hydroxybenzyl)phenyl butyrate and one percent of distearylthiodipropionate is added as an emulsion in sodium oleate solution to the latex obtained from emulsion copolymerization of the monomers. The latex is coagulated with a pure grade of aluminum sulfate and the coagulum, after washing, is dried for 20 hours at 70° C.

The amount of stabilizer employed in the rubber compositions of this invention varies from about 0.01 to about 5 percent by weight based on the weight of the rubber. The amount used depends somewhat upon the nature of the rubber being protected and the conditions of service to be encountered. Thus, in the tabilization of natural and synthetic rubber to be used in the manufacture of tires which are normally subjected to exposure to the elements, as well as to the action of sunlight, frictional heat, stress, and the like, the use of relatively high concentrations of this inhibitor is advantageous. On the other hand, when the article of manufacture is not to be subjected to such severe conditions, relatively low concentrations can be successfully utilized. Generally speaking, amounts ranging from about 0.1 to about 3 percent by weight give uniformly satisfactory results.

Other rubbers and elastomers which can be preserved according to this invention are the rubbery polymerizates of isoprene, butadiene-1,3, piperylene; also the rubbery copolymer of conjugated dienes with one or more polymerizable monoolefinic compounds which have the capability of forming rubber copolymers with butadiene-1,3, outsanding example of such monoolefinic compounds being those having the group $CH_2$=C, exemplified by styrene. Examples of such monoolefins are styrene, vinyl naphthalene, alpha methyl styrene, para-chlorostyrene, dichlorostyrene, acrylic acid, methyl acrylate, methyl methacrylate, methacrylonoitrile, methacrylamine, methyl vinyl ether, methyl vinyl ketone, vinylidine chloride, vinyl carbazole, vinyl pyridines, alkyl-substituted vinyl pyridines, etc. In fact, excellent stabilization is achieved by incorporating a compound of this invention in any of the well-known elastomers which are normally susceptible to deterioration in the presence of air, such as elastoprenes, elastolenes, elasthiomers, and elastoplastics.

The novel compounds of this invention are also effective antioxidant additives for olefinic polymers. Thus, an embodiment of this invention is a novel composition of matter comprising a high molecular weight polyolefin and a small antioxidant quantity, up to 5 percent, of a compound of this invention.

The polyolefins which are stabilized by the practice of this invention include polymers obtained from the polymerization of a hydrocarbon monoolefin having up to 5 carbon atoms. Examples of such monomers include ethylene, propylene, butylene and isobutylene. Thus, the polymers are homopolymers and copolymers of ethylene, propylene, butylene, isobutylene and the various pentenes and also ethylene-propylene terpolymers.

A particularly preferred embodiment of this invention is polypropylene containing a small antioxidant quantity, up to about 5 percent, of a composition comprising about 10–90 weight percent of 4-tert-butyl-2,6-bis-3,5-di-tert-butyl-4-hydroxybenzylphenyl acetate and about 10–90 weight percent dilaurylthiodipropionate.

Polypropylene is a hydrocarbon polymer derived from the polymerization of propylene. This polymerization can be accomplished by a great variety of methods which lead to products of diverse properties. Polypropylene of any nature may advantageously be utilized for preparing compositions according to the present invention. The polymers of propylene which are employed may, for example, be similar to those which may be obtained by polymerizing propylene in a basic aqueous medium and in the presence of polymerization favoring quantities of oxygen under relatively high pressures in excess of 500 of 1,000 atmospheres at temperatures between 150 and 275° C. Or, if desired, they may be similar to the essentially linear polymers ordinarily having greater molecular weights which may be obtained under relatively low pressures of 1 to 100 atmospheres using such catalysts to polymerize the propylene as mixtures of strong reducing agents and compounds of Group IV–B, V–B and VI–B metals of the Period System; chromium oxides on silicated alumina; hexavalent molybdenum compounds; and charcoal supported nickel-cobalt. The polypropylene may be prepared using aluminum alkyls and metal halides as catalysts. The polypropylene which results from these various polymerization processes may have a molecular weight in the range from 1,300 to over 1,000,000, depending on the particular conditions of polymerization employed.

There are several methods available for preparing the inhibited hydrocarbon polymer compositions of this invention. Thus, the blending of the antioxidant of this invention with a polymer such as, for example, polypropylene, may be carried out on open rolls, on internal mixers or may be accomplished by mixing with extrusion. It is also possible to prepare concentrated batches of the polymer containing excessive amounts of this additive and then mix the concentrate with additional polymer to prepare a composition of this invention. The preferred method of compounding the polymers is by milling on heated open rolls at elevated temperatures by methods well known to the art. The temperature range employed is sometimes critical as certain polypropylenes will not melt at low temperatures and tend to stick to the rolls at high temperatures. It is during this milling operation that polypropylene encounters its most severe test. The antioxidant may be initially mixed with the polymer in the dried state or it may be first dissolved in a suitable solvent, then sprayed on the polymer and milled in.

The following examples further illustrate this invention. In these examples the stabilizer composition is designated by a letter which represents the following compositions based upon weight percent active ingredient.

(A)

50% 2-tert-butyl-4-methyl-6-(3,5-di-tert-butyl-4-hydroxybenzyl)phenyl acetate
50% dilaurylthiodipropionate (B)

90% bis[2-tert-butyl-4-(3,5-di-tert-butyl-4-hydroxybenzyl)-6-methylphenyl]carbonate
10% distearylthiodipropionate (C)

10% 4-tert-butyl-2,6-bis(3,5-di-tert-butyl-4-hydroxybenzyl)phenyl acetate
90% dihexylthiodivalerate (D)

75% 2-methyl-4-tert-butyl-6-(3-methyl-5-tert-butyl-4-hydroxybenzyl)phenylbenzoate
25% di-2-octylthiodicaproate (E)

25% 2-methyl-6-tert-butyl-4-(3,5-di-tert-butyl-4-hydroxybenzyl)phenyl valerate
75% diundecylthiodipropionate (F)

50% bis[2-methyl-6-tert-butyl-4-(3,5-di-tert-butyl-4-hydroxybenzyl)phenyl]carbonate
50% dinonadecylthiodipropionate (G)

50% 2-methyl-6-($\alpha$-methylbenzyl)-4-(3,5-di-tert-butyl-4-hydroxybenzyl)phenyl acetate
50% dieicosylthiodipropionate (H)

60% 2,6-bis($\alpha$-methylbenzyl)-4-[3,5-bis($\alpha$-methylbenzyl)-4-hydroxybenzyl]phenyl acetate
40% dihexadecylthiodi-($\beta$-methylpropionate)

(I)

40% bis[2,6-di-methyl-4-(3,5-diisopropyl-4-hydroxybenzyl)phenyl]carbonate
60% 3,3'-thiobisoctadecylbenzoate (J)

70% bis[2,4-diisopropyl-6-(3,5-di-tert-octadecyl-4-hydroxybenzyl)phenyl]carbonate
30% dicetylthiodipropionate (K)

30% 2,6-bis(3,5-di-tert-octyl-4-hydroxybenzyl)-4-dodecylphenylvalerate
70% dioctadecylthiodi-($\beta$-ethylpropionate)

(L)

20% bis[2-methyl-6-isopropyl-4-(3,5-di-sec-butyl-4-hydroxybenzyl)phenyl]carbonate
80% dilaurylthiodipropionate (M)

50% 2-methyl-4-tert-butyl-6-(3,5-di-tert-butyl-4-hydroxybenzyl)acetate
50% dilaurylthiodipropionate Examples of the hydrocarbon polymer compositions of this invention prepared as described above wherein the stabilizer used is given a letter designation follow. All parts and percentages are by weight in these examples.

EXAMPLE 14

To 1,000 parts of a solid polypropylene polymer having a density of 0.905 and a Rockwell hardness greater than 85, and which is isotactic, is added and blended 5 parts of Stabilizer A.

EXAMPLE 15

To an isotactic polypropylene having a tensile strength greater than 4300 p.s.i. and a compressive strength of about 9000 p.s.i. is added sufficient Stabilizer B, to give a composition containing 0.5 percent of the compound.

EXAMPLE 16

To a wax-like polypropylene having a melting point above 130° C. and a molecular weight of about 4,000, a density of 0.913, is added 0.01 percent of Stabilizer C. The antioxidant is added to the polypropylene in the molten state and the mixture is allowed to solidify into the desired shape. A polypropylene product of outstanding oxidative stability results.

EXAMPLE 17

To 1,000 parts of polyethylene produced by oxygen catalyzed reaction under a pressure of 20,000 atmospheres and having an average molecular weight of 40,000 is added and mixed 2 parts of Stabilizer D.

EXAMPLE 18

To 100 parts of polyisobutylene having an average molecular weight of 100,000 is added 0.5 part of Stabilizer E.

EXAMPLE 19

To a master batch of high molecular weight polypropylene having an average molecular weight of 1,000,000 a tensile strength of 6,700 p.s.i., a Shore D hardness of 74 and a softening temperature under low load of 150° C. is added 5 percent of Stabilizer F

EXAMPLE 20

A linear polyethylene having a high degree of crystallinity, up to 93 percent and below one ethyl branched chain per hundred carbon atoms, a density of about 0.96 gram per milliliter and which has about 1.5 double bonds per 100 carbon atoms is treated with $50 \times 10^{-6}$ roentgens of β-radiation. To the thus irradiated polymer is added 0.005 percent of Stabilizer G.

EXAMPLE 21

To an ethylene-propylene terpolymer is added one percent of Stabilizer H. After milling in the antioxidant, an extremely oxidation resistant synthetic rubber results.

EXAMPLE 22

Two parts of Stabilizer I are added with milling to 100 parts of a low density polyethylene prepared by high pressure polymerization and which has an average molecular weight of 18,000 to 20,000. The resulting product is vastly improved in its oxidative stability.

EXAMPLE 23

To 10,000 parts of a polyethylene having an average molecular weight of about 100,000 and which has a tensile strength of 5,400 p.s.i., a Shore D hardness of 70 and a softening temperature of 130° C. under low load is added 10 parts of Stabilizer J, to prepare a composition of outstanding oxidative stability.

EXAMPLE 24

To the polyethylene in Example 23 is added 0.05 percent of Stabilizer K. The resulting composition has improved antioxidant characteristics.

EXAMPLE 25

To a polyisobutylene polymer having an average molecular weight of 35,000 is added sufficient Stabilizer L, to give a composition containing 0.03 percent of the antioxidant. The composition has improved antioxidant properties due to the presence of the additive.

EXAMPLE 26

To a polypropylene polymer having an average molecular weight of 500,0000 is added sufficient Stabilizer M, to give a composition containing 0.5 percent of the stabilizing composition. The resulting composition has improved heat stability and antioxidant properties due to the presence of the additive mixture.

In addition to the antioxidant of this invention, the saturated hydrocarbon polymers may contain other compounding and coloring additives including minor proportions of carbon black, elastomers, polyvinyl compounds, carboxylic acid esters, urea-aldehyde condensation products, flame retarding agents such as antimony trioxide and chlorinated hydrocarbons and various pigment compositions designed to impart color to the finished product.

In general, the amount of antioxidant employed in the hydrocarbon polymers of this invention varies from about 0.001 percent to about 5 percent or more. Most polymers are adequately protected with concentrations ranging from 0.01 to about 1 percent.

The following examples illustrate various other embodiments of this invention. The physical characteristics of the illustrative oils used in Examples 27–32 are shown in the following table.

PROPERTIES OF REPRESENTATIVE PETROLEUM HYDROCARBON OILS

| Oil | A | B | C | D | E | F |
|---|---|---|---|---|---|---|
| Gravity at 60° API | 30.3 | 30.5 | 28.8 | 31.1 | 20.5 | 31.0 |
| Viscosity, Saybolt: | | | | | | |
| Seconds at 100° F | 178.8 | 373.8 | 309.8 | 169.0 | 249.4 | 335.4 |
| Seconds at 210° F | 51.0 | 58.4 | 6.38 | 51.5 | 45.7 | 68.4 |
| Viscosity index | 154.2 | 107.4 | 141.9 | 157.8 | 35.8 | 144.4 |
| Pour point | −30 | +10 | −20 | −15 | | 0 |
| Flash point | 410 | 455 | | | 365 | 385 |
| Sulfur, percent | 0.2 | 0.3 | 0.3 | 0.3 | 0.3 | 0.1 |

The stabilizing additives employed are as follows:

(N)

2-dodecyl-4-tert-butyl-6-(3,5-di-tert-butyl-4-hydroxybenzyl)phenyl acetate (O)

4-methyl-2,6-bis(3-octadecyl-5-isopropyl-4-hydroxybenzyl)phenyl butyrate (P)

2-tert-butyl-4,6-bis(3,5-diisopropyl-4-hydroxybenzyl)-phenyl laurate (Q)

bis[2,6-dimethyl-4[3,5-bis(α-methylbenzyl)-4-hydroxybenzyl]phenyl]carbonate (R)

50% 4-tert-butyl-2,6-bis(3,5-di-tert-butyl-4-hydroxybenzyl)phenyl acetate
50% dilaurylthiodipropionate (S)

90% bis[2-methyl-6-isopropyl-4-(3,5-di-sec-butyl-4-hydroxybenzyl)phenyl]carbonate
10% dieicosylthiodipropionate (T)

10% 4-isooctyl-2,6-bis(3-methyl-5-tert-octadecyl-4-hydroxybenzyl)phenyl hexoate
90% distearyllaurylthiodibutyrate (U)

75% bis[2-methyl-4-tert-butyl-6-(3,5-di-sec-butyl-4-hydroxybenzyl)phenyl]carbonate
25% dilaurylthiodi-(β-ethylpropionate)

(V)

25% 2-methyl-6-tert-butyl-4-(3,5-di-tert-butyl-4-hydroxybenzyl)phenyl propionate
75% dinonadecylthiodipropionate

EXAMPLE 27

To 100,000 parts of Oil A is added, with stirring, 12 parts (0.012 percent) of Stabilizer N. The resulting oil is found to possess improved resistance to oxidative deterioration.

EXAMPLE 28

To 100,000 parts of Oil B is added 2,000 parts (2 percent) of Stabilizer O. On agitating this mixture, a homogenous solution results and the resulting oil composition possesses enhanced oxidation resistance.

EXAMPLE 29

With 100,000 parts of Oil C is blended 50 parts (0.05 percent) of Stabilizer P. The resulting oil possesses enhanced resistance against oxidative deterioration.

EXAMPLE 30

To 100,000 parts of Oil D is added 100 parts (0.1 percent) of Stabilizer Q. The resulting oil is found to possess enhanced resistance against oxidative deterioration.

EXAMPLE 31

With 100,000 parts of Oil E is blended 5 parts (0.005 percent) of Stabilizer R. After mixing, the resulting oil possesses enhanced resistance to oxidation.

EXAMPLE 32

To 100,000 parts of Oil F is added 150 parts (0.15 percent) of Stabilizer S. The resulting oil possesses enhanced resistance against oxidative deterioration.

EXAMPLE 33

With 100,000 parts of di-(sec-amyl) sebacate having a viscosity at 210° F. of 33.8 Saybolt Universal Seconds (SUS), a viscosity index of 133 and a molecular weight of 342.5 is blended 100 parts (0.1 percent) of Stabilizer T. The resulting diester lubricant possesses greatly enhanced resistance against oxidative deterioration.

EXAMPLE 34

To 100,000 parts of di-(2-ethylhexyl) sebacate having a viscosity at 210° F. of 37.3 SUS, a viscosity index of 152 and a molecular weight of 426.7 is added 1,000 parts (1 percent) of Stabilizer U. After mixing, the resultant diester lubricant possesses greatly enhanced oxidation resistance.

EXAMPLE 35

To 100,000 parts of di-(2-ethylhexyl) adipate having a viscosity at 210° F. of 34.2 SUS, a viscosity index of 121 and a molecular weight of 370.6 is added 2,000 parts (2 percent) of Stabilizer V. After mixing, the resultant diester lubricant possesses outstanding resistance against oxidative deterioration.

Most lubricant compositions are adequately protected by the inclusion of from 0.01 to about 5 percent of an antioxidant of this invention. However, in some cases, it is desirable to add amounts outside this range.

The compounds of this invention effectively stabilize such lubricating and industrial oils as crankcase lubricating oils, transformer oils, turbine oils, transmission fluids, cutting oils, gear oils, industrial oils, mineral white oils, glass annealing oils, oils thickened with soaps and inorganic thickening agents (grease), and, in general, engine and industrial oils which are derived from crude petroleum and are normally susceptible to deterioration in the presence of air, particularly at elevated temperatures and most particularly in the presence of iron oxide. Furthermore, the novel compounds of this invention very effectively enhance the oxidation resistance of such diester oils as diethyl oxalate; di-sec-butyl malonate; di-(2-hexyl) succinate; di-(isoheptyl) pimelate; di-(3-decyl) suberate; di-sec-amyl glutarate; di-(isobutyl) glutarate; di-(2-ethylbutyl) glutarate; di-(2-ethylhexyl) glutarate; di-sec-amyl adipate; di-(3-methylbutyl)adipate; diethyl adipate; di-2-ethylhexyl adipate; di-(2-ethylbutyl) azelate; di-(2-ethylhexyl azelate; di-sec-amyl azelate; di-(isobutyl) azelate; di-sec-amyl sebacate; di-sec-butyl sebacate; di-(2-ethylhexyl) sebacate; the glutarates, adipates, azelates and sebacates of branched chain secondary alcohols, such as undecanol, tetradecanol; etc.; and, in general, diesters of the type described in the literature as useful for synthetic lubricant purposes.

In the lubricant compositions of this invention effective use can be made of other additives which are known to the art, such as other inhibitors, detergent-dispersants, pour point depressants, viscosity index improvers, antifoam agents, rust inhibitors, oiliness or film strength agents, dyes, and the like. Of the inhibitors which can be effectively used in combination with our inhibitors are sulfurized sperm oil, sulfurized terpenes, sulfurized paraffin wax olefins, aromatic sulfides, alkyl phenol sulfides, lecithin, neutralized dithiophosphates, phosphorus pentasulfide-terpene reaction products, diphenylamine, phenylnaphthyl amine, β-naphthol, pyrogallol, and the like. Typical of the detergent additives that can be used in the compositions of this invention are metallic soaps of high molecular weight acids, such as aluminum naphthenates, calcium phenyl stearates, calcium alkyl salicylates, alkaline earth metal petroleum sulfonates, alkaline earth metal alkyl phenol sulfides (barium amyl phenol sulfide, calcium octyl phenol disulfide, etc.), metal salts of wax-substituted phenol derivatives, and the like. Of the viscosity index improvers and pour point depressants, effective use can be made of polymers of the esters of methacrylic acids, highly fatty alcohols and the corresponding polymers of esters of acrylic acid and higher fatty alcohols. These and other additives which can be employed in the compositions of this invention will now be well known to those skilled in the art.

The following examples illustrate some further organic materials normally susceptible to oxidative deterioration containing the stabilizing compounds and compositions of the present invention. In these examples the stabilizers employed are as follows:

(W)

2,4-didodecyl-6-(3,5-didodecyl-4-hydroxybenzyl)phenyl butyrate (X)

bis[2,6-di-methyl-4-(3,5-di-tert-butyl-4-hydroxybenzyl) phenyl]carbonate (Y)

2-methyl-bis($\alpha,\alpha$-dimethylbenzyl)-4-[3,5-bis($\alpha$-methyl-benzyl)-4-hydroxybenzyl]phenyl tridecoate (Z)

50% 2-cetyl-4-methyl-6-(3-methyl-5-eicosyl-4-hydroxybenzyl)phenyl pelargonate
50% dilaurylthiodipropionate (AA)

90% bis[2-methyl-4,6-bis(3,5-di-tert-butyl-4-hydroxybenzyl)phenyl]carbonate
10% didecylthiodipropionate

EXAMPLE 36

To 1,000 parts of gasoline having 44.0 percent paraffins, 17.9 percent olefins and 38.1 percent aromatics, an initial evaporation temperature of 94° F. and a final evaporation temperature of 119° F. is added 10 parts of Stabilizer W. The mixture is agitated to dissolve the stabilizer. The resulting fuel has an excellent stability to oxidative deterioration.

EXAMPLE 37

To 1,000 parts of commercially available diesel fuel having an octane number of 51.7 and a 50 percent evaporation temperature of 509° F. is added 3 parts of Stabilizer X. The resulting fuel is stable to oxidative deterioration.

EXAMPLE 38

To an antiknock fluid composition which is to be used as an additive to gasoline and which contains 61.5 parts of tetraethyllead, 17.9 parts of ethylene dibromide and 18.8 parts of ethylene dichloride is added, with agitation, 1.3 parts of Stabilizer Y. The resulting composition is stable for long periods when exposed to air.

EXAMPLE 39

With 1,000 parts of melted lard is mixed one part (0.1 percent) of Stabilizer Z. After cooling, the lard can be stored for long periods of time without the development of rancidity.

EXAMPLE 40

To 5,000 parts of olive oil is added one part of Stabilizer AA, and the mixture is agitated to produce a homogeneous blend which is stable to oxidative deterioration for a long period.

I claim:

1. Organic material normally susceptible to oxidative degradation selected from the group consisting of ethylenically unsaturated derived hydrocarbon solid synthetic polymers and natural rubber containing a stabilizing quantity, up to 5 weight percent, of a compound having the formula:

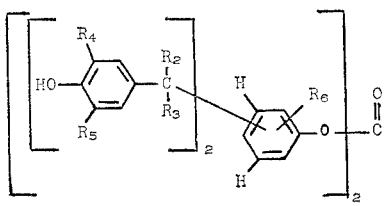

wherein $R_2$ and $R_3$ are selected from the group consisting of hydrogen and lower alkyl radicals having 1-6 carbon atoms; $R_4$ is a hydrocarbon radical selected from the group consisting of alkyl radicals containing 1-18 carbon atoms and aralkyl radicals containing 8-18 carbon atoms; $R_5$ is an alpha-branched hydrocarbon radical containing 3-18 carbon atoms; and $R_6$ is selected from the group consisting of hydrogen, alkyl radicals having 1-12 carbon atoms, aryl radicals having 6-12 carbon atoms and aralkyl radicals having 7-12 carbon atoms.

2. A composition of claim 1 wherein said compound is bis[2 - tert - butyl-4,6-bis(3,5-di-tert-butyl-4-hydroxybenzyl)phenyl]carbonate.

3. A composition of claim 1 wherein said compound is bis[2-methyl-4,6-bis(3,5-di-tert-butyl-4-hydroxybenzyl)phenyl]carbonate.

4. A composition of claim 1 wherein said compound is bis[4 - tert - butyl-2,6-bis(3,5-di-tert-butyl-4-hydroxybenzyl)phenyl]carbonate.

5. The composition of claim 1 wherein said compound is bis[4,6-bis(3,5-di-tert-butyl-4-hydroxybenzyl)-o-tolyl]carbonate.

6. The composition of claim 1 wherein said organic material is a high molecular weight polyolefin.

7. The composition of claim 6 wherein said high molecular weight polyolefin is a polypropylene.

8. Organic material normally susceptible to oxidative degradation selected from the group consisting of ethylenically unsaturated derived hydrocarbon solid synthetic polymers and natural rubber containing a stabilizing quantity, up to 5 weight percent, of a stabilizing composition comprising:

(A) about 10-90 weight percent of a compound having the formula:

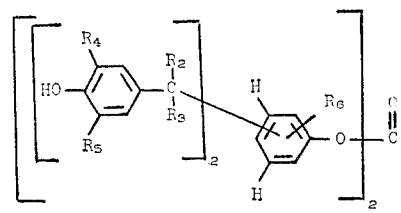

wherein $R_2$ and $R_3$ are selected from the group consisting of hydrogen and lower alkyl radicals having 1-6 carbon atoms; $R_4$ is a hydrocarbon radical selected from the group consisting of alkyl radicals containing 1-18 carbon atoms and aralkyl radicals containing 8-18 carbon atoms; $R_5$ is an alpha-branched hydrocarbon radical containing 3-18 carbon atoms; and $R_6$ is selected from the group consisting of hydrogen, alkyl radicals having 1-12 carbon atoms, aryl radicals having 6-12 carbon atoms and aralkyl radicals having 7-12 carbon atoms; and (B) about 10-90 weight percent of a sulfur compound having the formula:

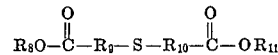

wherein $R_9$ and $R_{10}$ are divalent hydrocarbon radicals selected from the group consisting of alkylene radicals containing about 1-6 carbon atoms and arylene radicals containing about 6-12 carbon atoms and $R_8$ and $R_{11}$ are alkyl radicals containing about 6-20 carbon atoms.

9. The composition of claim 8 wherein said organic material is a high molecular weight polyolefin.

10. The composition of claim 9 wherein said high molecular weight polyolefin is a polypropylene.

11. The composition of claim 9 wherein said compound is bis[4,6 - bis(3,5-di-tert-butyl-4-hydroxybenzyl)-o-tolyl]carbonate.

References Cited

UNITED STATES PATENTS 3,265,661  8/1966  Rocklin _____ 260—45.85
3,510,507  5/1970  Bown et al. _____ 260—45.95

DONALD E. CZAJA, Primary Examiner

V. P. HOKE, Assistant Examiner

U.S. Cl. X.R.

99—163; 252—56, 404, 406; 260—398.5, 666.5, 810, 814

UNITED STATES PATENT OFFICE
CERTIFICATE OF CORRECTION

Patent No. 3,644,281  Dated February 22, 1972

Inventor(s) Bernard R. Meltsner

It is certified that error appears in the above-identified patent and that said Letters Patent are hereby corrected as shown below:

Column 4, line 28, "RaO" should read -- $R_8O$ --; line 29, formula should be labeled "IV" rather than "V". Column 6, in the second equation, that part of the equation reading

 should read 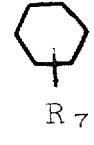

$R_5$ $R_7$

Column 11, lines 7-8, insert "(" after "2,6-bis-" and insert ")" after "4-hydroxybenzyl".

Signed and sealed this 15th day of August 1972.

(SEAL)
Attest:

EDWARD M. FLETCHER, JR.
Attesting Officer

ROBERT GOTTSCHALK
Commissioner of Patents